(12) United States Patent
Chang et al.

(10) Patent No.: US 7,808,490 B2
(45) Date of Patent: Oct. 5, 2010

(54) DEVICE AND METHOD FOR DETERMINING TOUCH POSITION ON SENSING AREA OF CAPACITIVE TOUCH PANEL

(75) Inventors: Chin-Fu Chang, Taipei County (TW); Cheng-Han Lee, Taipei County (TW)

(73) Assignee: Egalax_Empia Technology Inc., Taipei (TW)

( * ) Notice: Subject to any disclaimer, the term of this patent is extended or adjusted under 35 U.S.C. 154(b) by 617 days.

(21) Appl. No.: 11/846,707

(22) Filed: Aug. 29, 2007

(65) Prior Publication Data

US 2009/0058818 A1    Mar. 5, 2009

(51) Int. Cl.
*G06F 3/041* (2006.01)
(52) U.S. Cl. .................. 345/173; 345/174; 178/18.01
(58) Field of Classification Search ......... 345/173–179; 178/18.01–18.04, 19.01–19.04
See application file for complete search history.

(56) References Cited

U.S. PATENT DOCUMENTS

| | | | | |
|---|---|---|---|---|
| 6,124,848 A | * | 9/2000 | Ballare et al. | 345/179 |
| 6,373,474 B1 | * | 4/2002 | Katabami | 345/173 |
| 6,417,846 B1 | * | 7/2002 | Lee | 345/173 |
| 6,492,979 B1 | * | 12/2002 | Kent et al. | 345/173 |
| 7,355,592 B2 | * | 4/2008 | Hong et al. | 345/173 |
| 2006/0202969 A1 | * | 9/2006 | Hauck | 345/173 |
| 2006/0207806 A1 | * | 9/2006 | Philipp | 178/18.05 |
| 2006/0227114 A1 | * | 10/2006 | Geaghan et al. | 345/173 |
| 2006/0279548 A1 | * | 12/2006 | Geaghan | 345/173 |
| 2007/0216657 A1 | * | 9/2007 | Konicek | 345/173 |
| 2008/0165138 A1 | * | 7/2008 | Li | 345/173 |

* cited by examiner

*Primary Examiner*—Kimnhung Nguyen
(74) *Attorney, Agent, or Firm*—Rosenberg, Klein & Lee

(57) ABSTRACT

Described is a device and a method for determining a touch position on a sensing area of a capacitive touch panel. In the device and method, an alternating current (AC) scan signal having a frequency and a current value is supplied to each of four corners of the capacitive touch panel. Next, the frequencies of the AC scan signals are each rapidly switched among a group of specific frequencies. The current values of the AC scan signals detected. In response, a group of selected frequencies is selected according to a noise filtering procedure from the group of specific frequencies based on the current values. Final current values are obtained by calculating the current values of the AC scan signals of the group of selected frequencies. Finally, the touch position on the capacitive touch panel is determined based on the final current values.

16 Claims, 9 Drawing Sheets

DEVICE AND METHOD FOR DETERMINING TOUCH POSITION ON SENSING AREA OF CAPACITIVE TOUCH PANEL

BACKGROUND OF THE INVENTION

1. Field of the Invention

The present invention relates to a touch panel and particularly to a device and method for determining a touch position on a sensing area of a capacitive touch panel.

2. Description of the Related Art

Conventionally, an electronic device is inputted by a mouse and a keyboard, which is yet not intuitive to human. Thereafter, touch panel has been developed and gradually widely used in various large and small sized electronic devices. In inputting to the electronic device by using the touch panel, a user touches on the touch panel by his finger or a stylus, and a sensing means lying under the touch panel then detects a position of the touch on the touch panel. The information of the detected position is subsequently transmitted to a circuitry unit cooperating with a central processing unit (CPU) for obtaining an electric signal representing this information and then interpreting the information to obtain a position signal for the touch position to achieve a desired function. There have been several kinds of touch panel in terms of the sensing means or mechanism so far: resistive, capacitive, surface acoustic wave (SAW), infrared (IR) type touch panels, etc.

In the capacitive touch panel, a capacitive mechanism is used for position determination where several currents are supplied onto the touch panel when a touch is impinged on the touch panel and are measured and then a relationship among the measured currents is deduced to obtain the touch position. Referring to FIG. 1, specifically, the capacitive touch panel 10 comprises a sensing area 11 logically comprising regions A, B, C and D having together the arrangement as shown. The regions A, B, C and D are alternatively applied with identical alternating current (AC) scan signals AC1, AC2, AC3 and AC4, respectively. When a touch point P is registered with the sensing area 11 of the touch panel 10, currents I1, I2, I3 and I4 provided by the scan signals AC1, AC2, AC3 and AC4, respectively, to the touch panel 10 are measured and the measured currents I1, I2, I3 and I4 can be calculated to obtain an abscissa and an ordinate values (X, Y) of the touch point P. The currents I1, I2, I3 and I4 vary since the touch point, e.g. a fingertip of a user, P is electrically conductive and thus changes the resistance of the touch point P on the sensing area 11. Specifically, the coordinate (X, Y) of the touch point P is determined by the following equation:

$$X = \frac{(\Delta I4 + \Delta I3) - (\Delta I1 + \Delta I2)}{\sum_i \Delta Ii}, \quad (1)$$

and $$Y = \frac{(\Delta I1 + \Delta I4) - (\Delta I2 + \Delta I3)}{\sum_i \Delta Ii}, \quad (2)$$

wherein $\Delta Ii$ is a difference of each of the currents Ii (i=1, 2, 3 and 4) before and after the touch point P is registered with the sensing area 11 of the touch panel 10.

However, since the touch panel 10 and a user generally correspond to different reference potentials, the touch panel 10 is susceptible to noise brought by the user's fingertip and even the environment surrounding the touch panel 10, for example, electromagnetic radiation of a liquid crystal device (LCD) or cathode ray tube (CRT). As a result, the thus detected touch position on the touch panel 10 is generally accompanied with an error.

In this regard, many noise elimination technologies have been set forth. The present invention also sets forth herein a device and method for determining a touch position on a capacitive touch panel.

SUMMARY OF THE INVENTION

It is, therefore, an object of the present invention to provide a device for determining a touch position on a sensing area of a capacitive touch panel with a high precision by reducing a noise effect on the capacitive touch panel can be greatly obviated.

It is another object of the present invention to provide a method for determining a touch position on a sensing area of a capacitive touch panel with a high precision by reducing a noise effect on the capacitive touch panel can be greatly obviated.

In accordance with an aspect of the present invention, a device for determining a touch position on a sensing area of a capacitive touch panel comprises a signal providing unit alternatively providing an alternating current (AC) scan signal having a frequency and a current value to each of four corners of the capacitive touch panel, respectively; a frequency switching unit rapidly switching the frequency of the AC scan signal associated with each of the four corners among a group of specific frequencies; a voltage driving and current detecting unit driving the capacitive touch panel by alternatively using the AC scan signal associated with each of the four corners, respectively, and detecting the current value of the AC scan signal of each of the group of specific frequencies associated with each of the four corners of the capacitive touch panel, respectively; a valid frequency selecting unit receiving the current value of the AC scan signal of each of the group of specific frequencies associated with each of the four corners of the capacitive touch panel, respectively, and selecting a group of selected frequencies according to a noise filtering procedure from the group of specific frequencies associated with each of the four corners of the capacitive touch panel based on the current value of each of the group of specific frequencies, respectively; a valid current value selecting unit obtaining a final current value by calculating the current value of the AC scan signal of each of the group of selected frequencies associated with each of the four corners of the capacitive touch panel, respectively; and a position coordinate calculation unit calculating a coordinate value of the touch position on the capacitive touch panel based on the final current value associated with each of the four corners of the capacitive touch panel, respectively.

In accordance with another aspect of the present invention, a method for determining a touch position on a sensing area of a capacitive touch panel comprises the steps of alternatively providing an AC scan signal having a frequency and a current value to each of four corners of the capacitive touch panel, respectively; rapidly switching the frequency of the AC scan signal associated with each of the four corners among a group of specific frequencies; driving the capacitive touch panel by alternatively using the AC scan signal associated with each of the four corners, respectively, and detecting the current value of the AC scan signal of each of the group of specific frequencies associated with each of the four corners of the capacitive touch panel, respectively; receiving the current value of the AC scan signal of each of the group of specific frequencies associated with each of the four corners of the capacitive touch panel, respectively, and selecting a group of selected frequencies according to a noise filtering procedure from the group of specific frequencies associated with each of the four corners of the capacitive touch panel based on the current value of each of the group of specific frequencies, respectively; obtaining a final current value by calculating the current value of the AC scan signal of each of the group of selected frequencies associated with each of the four corners of the capacitive touch panel, respectively; and calculating a coordinate value of the touch position on the capacitive touch panel based on the final current value associated with each of the four corners of the capacitive touch panel, respectively.

By means of the inventive device and method, since the determination of the touch position on the capacitive touch panel is relatively more free from the noise effect as compared to that of the prior art, the insufficient precision issue of the touch position determination on the capacitive touch panel is greatly overcome.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE INVENTION

The present invention is a device and method for determining a touch position on a sensing area of a capacitive touch panel according to the present invention, and will be described taken in the preferred embodiments with reference to the accompanying drawings.

Figure 1:
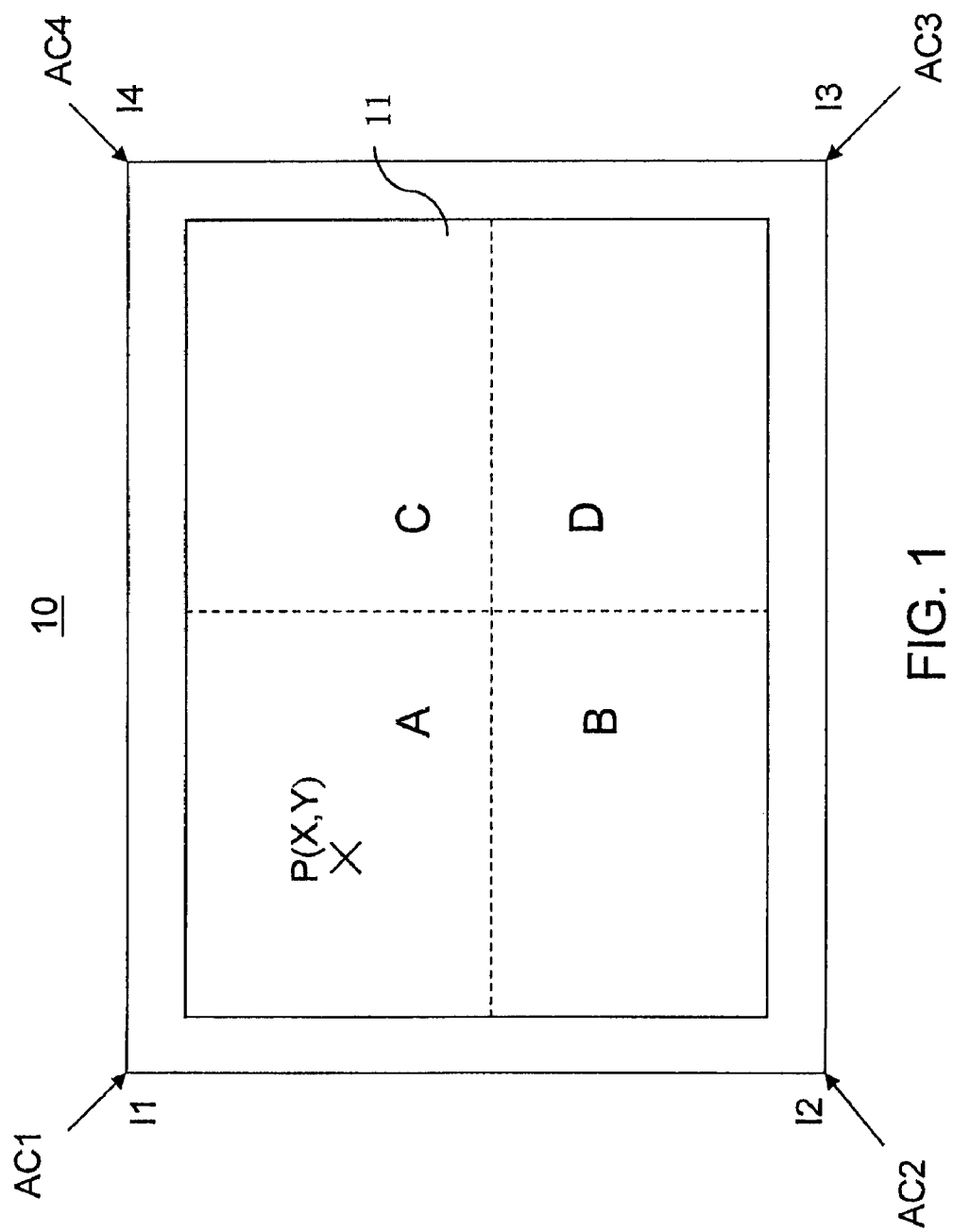
FIG. 1 is an illustration of how a conventional touch position determination is made on a sensing area of a capacitive touch panel.
Figure 2:
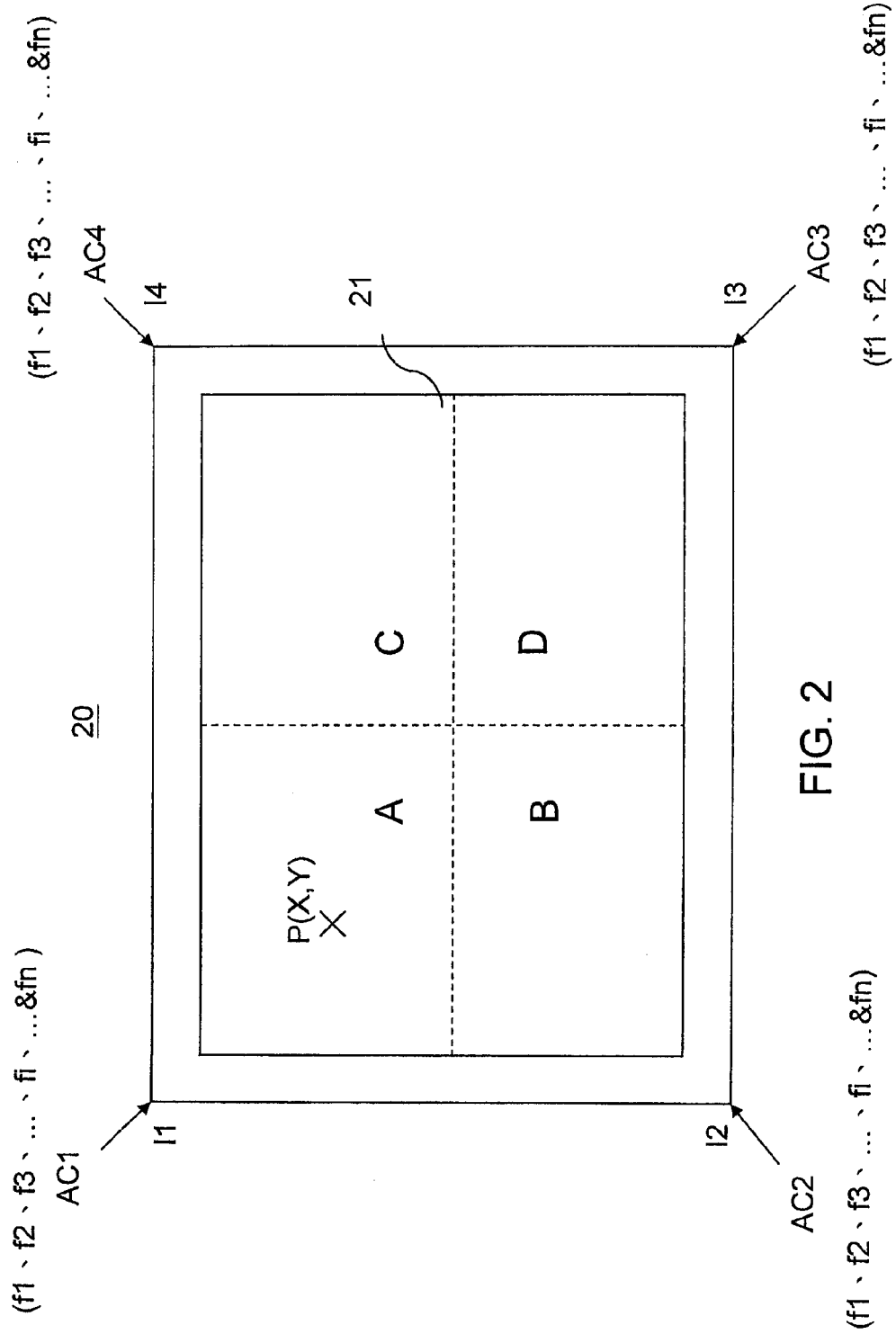
FIG. 2 is an illustration of how the touch position on the sensing area of the capacitive touch panel is determined according to the present invention.

Referring to FIG. 2, which is an illustration of how the touch position on the sensing area of the capacitive touch panel is determined according to the present invention. As shown, a capacitive touch panel 20 comprises a sensing area 21, logically comprising regions A, B, C and D having together the arrangement as shown. The regions A, B, C and D are alternatively supplied with identical alternating current (AC) scan signals AC1, AC2, AC3 and AC4, respectively. When a touch point P is registered with the sensing area 21 of the touch panel 20, currents I1, I2, I3 and I4 provided by the scan signals AC1, AC2, AC3 and AC4, respectively, to the touch panel 20 are measured and the measured currents I1, I2, I3 and I4 can be calculated to obtain an abscissa and an ordinate values (X,Y) of the touch point P. The currents I1, I2, I3 and I4 vary since the touch point, e.g. a fingertip of a user, P is electrically conductive and thus changes the resistance of the touch point P on the sensing area 21. Specifically, the coordinate (X, Y) of the touch point P is determined by the following equation:

$$X = \frac{(\Delta I4 + \Delta I3) - (\Delta I1 + \Delta I2)}{\sum_i \Delta Ii}, \quad (1)$$

and $$Y = \frac{(\Delta I1 + \Delta I4) - (\Delta I2 + \Delta I3)}{\sum_i \Delta Ii}, \quad (2)$$

wherein $\Delta Ii$ is a difference of each of the currents Ii (i=1, 2, 3 and 4) before and after the touch point P is registered with the sensing area 21 of the touch panel 20.

To reduce noise occurring on the capacitive touch panel 20 when the touch point P is registered with the sensing area 21 of the capacitive touch panel 20, the noise brought from a user contacting with of the capacitive touch panel 20 and the ambient environment of the capacitive touch panel 20 are alike, so that the touch position P can be prevented from being erroneously determined, the AC scan signals AC1, AC2, AC3 and AC4 are each alternatively and continuously provided a group of different frequencies, f1, f2, . . . , fi, . . . , fn. The provision of the group of different frequencies f1, f2, . . . , fi, . . . , fn for each of the AC scan signals AC1, AC2, AC3 and AC4 is schematically illustrated in FIG. 3.

Figure 3:
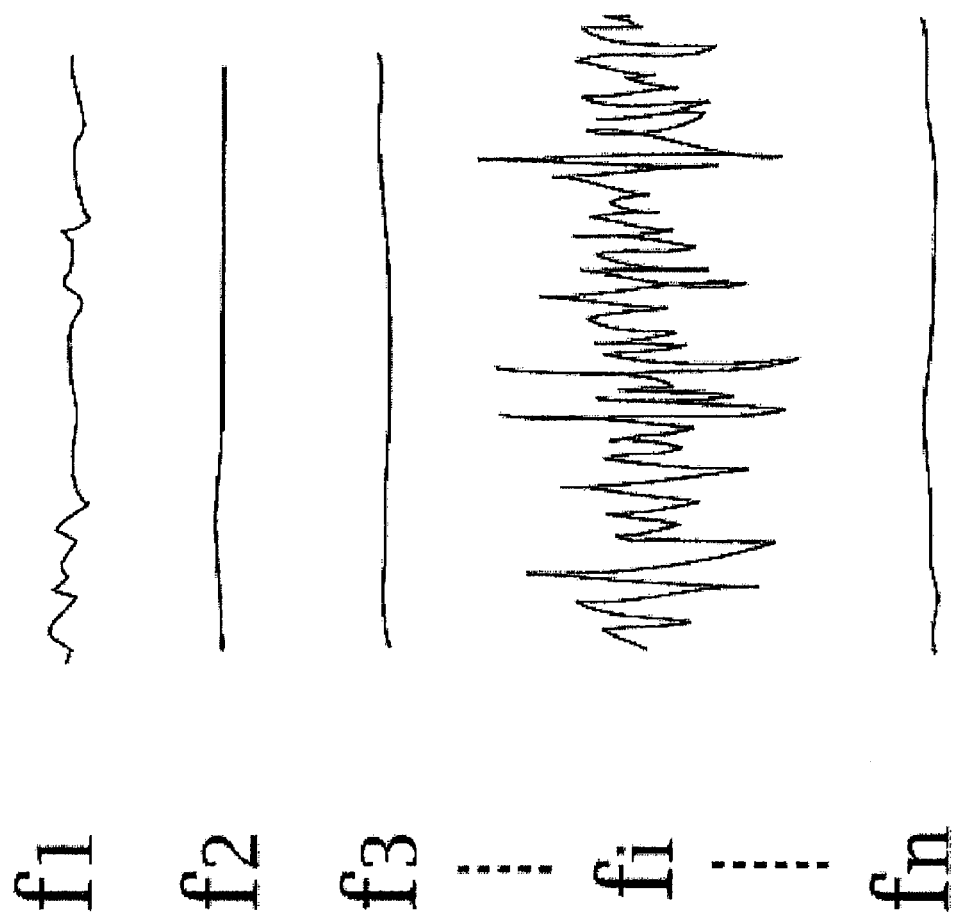
FIG. 3 is a further illustration of how the touch position on the sensing area of the capacitive touch panel is determined according to a first embodiment of the present invention.

In FIG. 3, one of the AC scan signals AC1, AC2, AC3 and AC4, for example AC1, is depicted for illustration with different frequencies, the frequencies being labeled with f1, f2, . . . , fi, . . . , fn. As shown, the AC scan signal AC1 having the frequency f1 is observed with some noise. The AC scan signal AC1 having the frequency fi is observed with a large noise. As for the other frequencies, the AC scan signal AC1 has hardly noise thereon. Since all kinds of noises are a narrow-band signal, the noise on the AC scan signal AC1 can be filtered out once the frequency of the noise is known and then removed.

In a first embodiment, the frequency f1 corresponding to noise is removed from the AC scan signal, AC1. Or, the frequency fi corresponding to the large noise is also removed from the AC scan signal, AC1. How large noise on the AC scan signal, AC1, should the corresponding frequency be removed depends on a threshold predetermined by a designer providing the driving of the capacitive touch panel. In this case, the currents I1 formed by the use of the frequencies f1, f2, . . . , fi, . . . , fn except frequency fi or frequencies f1 and fi on the AC scan signal AC1 are averaged. And the averaged current I1 is served as the current I1 in Eq. (1). As such, the current I1 in Eq. (1) can be exempted from the effect of the noise corresponding to the frequency fi or frequencies f1 and fi and thus the coordinate value of the touch position P can be more correctly determined, compared with the case without the frequency fi or frequencies f1 and fi being removed. The same description is also applicable to the other AC scan signals AC2, AC3 and AC4.

Figure 4:
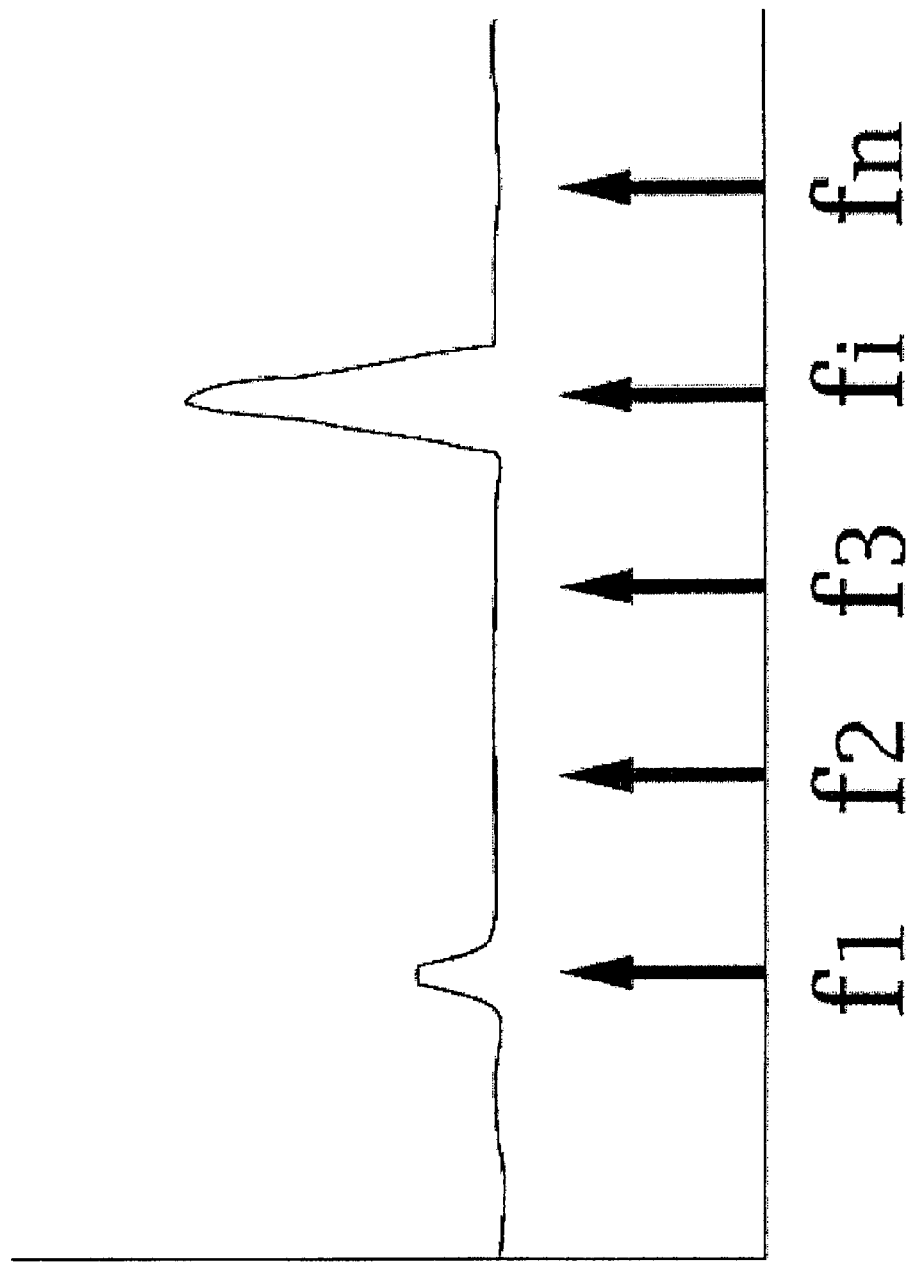
FIG. 4 is a further illustration of how the touch position on the sensing area of the capacitive touch panel is determined according to a second and third embodiments of the present invention, respectively.

In a second embodiment shown in FIG. 4, the frequency fi or frequencies f1 and fi is filtered out from the AC scan signal AC1 after a first touch point is registered with the touch panel in a specific condition. Namely, the AC scan signal AC1 of the frequency fi or frequencies f1 and fi is not supplied again for the second and the successive touch points in the specific condition. As compared to the first embodiment, the AC scan signal AC1 is supplied with a relatively shorter period since not all the frequencies f1, f2, . . . , fi, . . . , fn are involved in the supply of the AC scan signal AC1. Referring to FIG. 4, which is a spread spectrum and used for illustrating the present embodiment. As shown, when the first touch point is registered with the touch panel in a specific condition, the AC scan signal AC1 has different amplitudes when the different frequencies f1, f2, . . . , fi, . . . , fn are involved, respectively. It means that noises of different frequencies, i.e. variations of the amplitudes of the current of the AC scan signal AC1 corresponding to different frequencies, have been introduced to the capacitive touch panel. In addition, the amplitudes corresponding to the frequencies f1 and fi reflect the noises from the user and ambient environment. By removing the frequencies fi or frequencies f1 and fi from the AC scan signal AC1 after the first touch point on the touch panel, the noise effect on the touch position determination can be greatly eliminated. Similarly, the above description made for the AC scan signal AC1 is also applicable to the other AC scan signals AC2, AC3 and AC4.

In a third embodiment, the principle thereof is identical to that of the second embodiment except that a single frequency with a minimum variation of the current I1 is used for the AC scan signal AC1. In this manner, the time required for the AC scan signal AC1 for touch position determination is further shortened. Similarly, the description made for the AC scan signal AC1 is also applicable to the other AC scan signals AC2, AC3 and AC4.

The above described specific condition may be when the capacitive touch panel is set up, the capacitive touch panel is powered on and a specific work task is performed on the capacitive touch panel. In addition, the set of frequencies f1, f2, . . . , fi, . . . , fn used for the AC scan signal can be switched in an arbitrary rate, and the frequencies f1, f2, . . . , fi, . . . , fn are all less than 200 kHz. And the AC scan signal for each of the four corners of the capacitive touch panel is one of a square-wave signal and a sinusoidal or cosine-wave signal.

In this manner, the currents I1, I2, I3 and I4 can be presented without being substantially affected by the noises and thus reflect the position of the touch contacted with the capacitive touch panel in an improved precision. Namely, the touch position P on the capacitive touch panel can be more unlikely erroneously determined.

Figure 5:
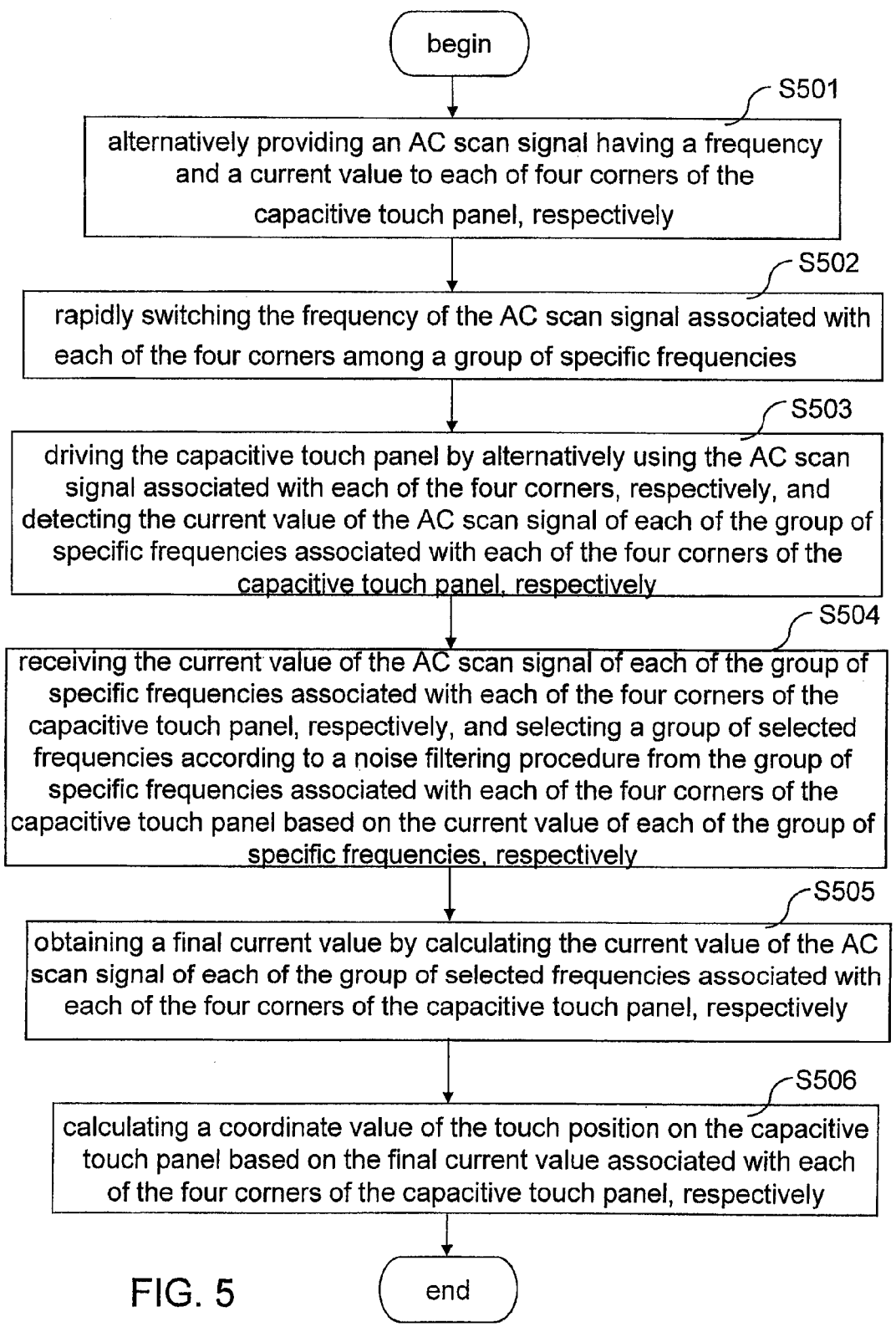
FIG. 5 is a flow chart illustrating a method for determining the touch position on the sensing area of the capacitive touch panel according to the present invention.
Figure 5A:
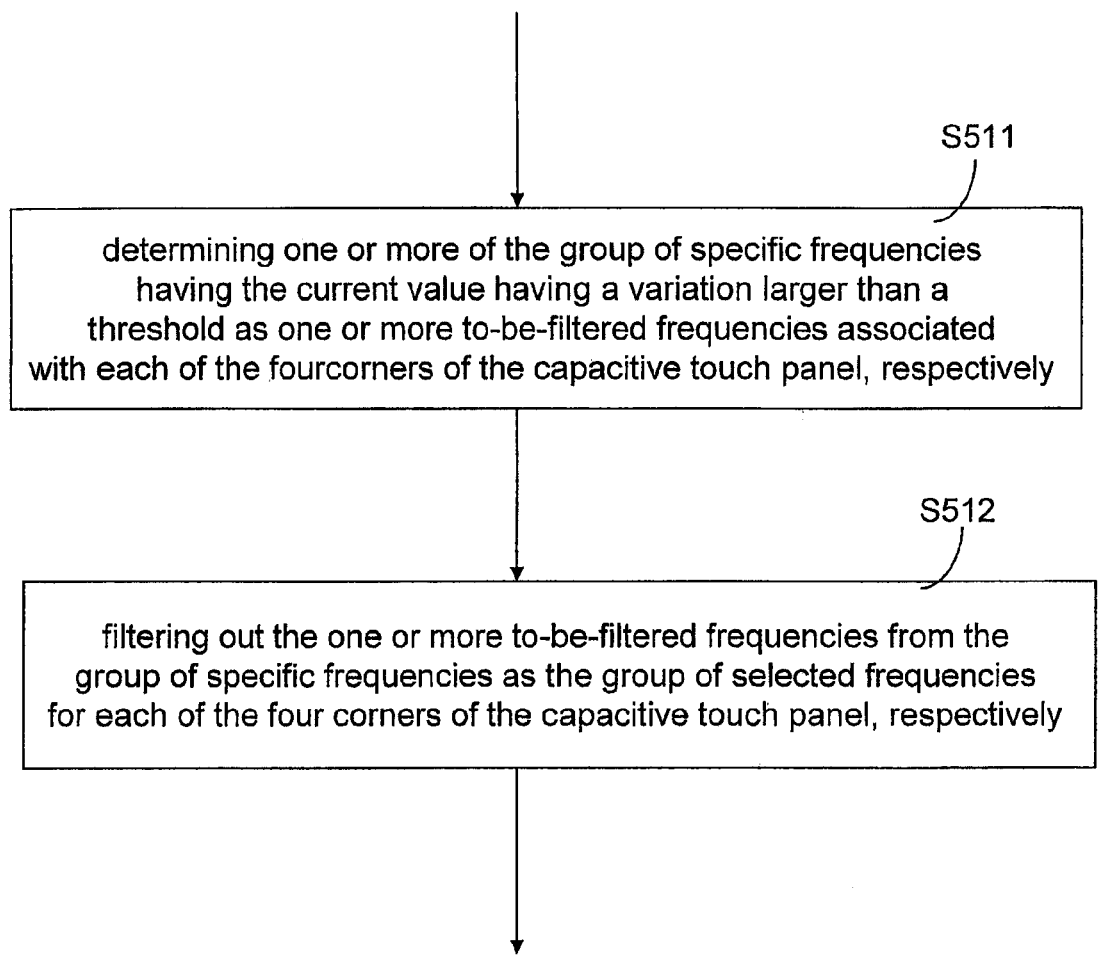
FIG. 5A through FIG. 5C are flowcharts of noise filtering procedures performed in the method of FIG. 5 according to a first, second and third embodiments of the present invention, respectively.

The following description will be dedicated to a method for determining a touch position on a sensing area of a capacitive touch panel with reference to FIG. 5, although the principle thereof has been explained above.

First, an AC scan signal having a frequency and a current value is alternatively provided to each of four corners of the capacitive touch panel, respectively (S501). Next, the frequency of the AC scan signal associated with each of the four corners is rapidly switched among a group of specific frequencies (S502). Then, the capacitive touch panel is driven by alternatively using the AC scan signal associated with each of the four corners, respectively, and the current value of the AC scan signal of each of the group of specific frequencies associated with each of the four corners of the capacitive touch panel is detected, respectively (S503). Thereafter, the current value of the AC scan signal of each of the group of specific frequencies associated with each of the four corners of the capacitive touch panel is received, respectively, and a group of selected frequencies is selected according to a noise filtering procedure from the group of specific frequencies associated with each of the four corners of the capacitive touch panel based on the current value of each of the group of specific frequencies, respectively (S504). Subsequently, a final current value is obtained by calculating the current value of the AC scan signal of each of the group of selected frequencies associated with each of the four corners of the capacitive touch panel, respectively (S505). Finally, a coordinate value of the touch position on the capacitive touch panel is calculated based on the final current value associated with each of the four corners of the capacitive touch panel, respectively (S506).

In the first embodiment shown in FIG. 5, the noise filtering procedure comprises the following steps. One or more of the group of specific frequencies having the current value having a variation larger than a threshold are determined as one or more to-be-filtered frequencies associated with each of the four corners of the capacitive touch panel, respectively (S511). Then, the one or more to-be-filtered frequencies are filtered out from the group of specific frequencies as the group of selected frequencies for each of the four corners of the capacitive touch panel, respectively (S512). In addition, the step S505 is a step of summing the current value associated with each of the group of selected frequencies for each of the four corners of the capacitive touch panel, respectively (now shown).

Figure 5B:
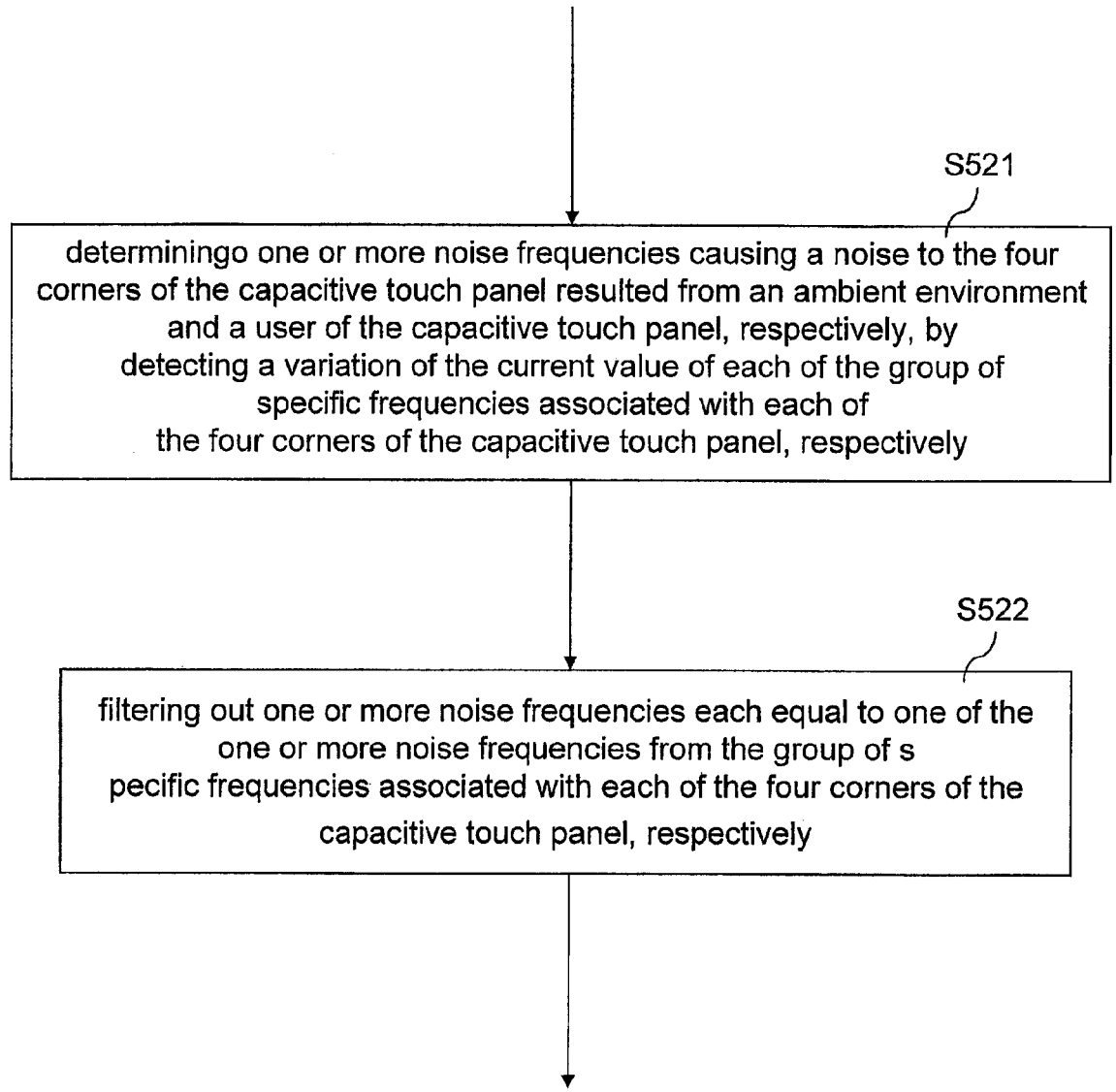

In the second embodiment shown in FIG. 5B, the noise filtering procedure comprises the following steps. One or more noise frequencies causing a noise to the four corners of the capacitive touch panel resulted from an ambient environment and a user of the capacitive touch panel are determined, respectively, by detecting a variation of the current value of each of the group of specific frequencies associated with each of the four corners of the capacitive touch panel, respectively (S521). Then, one or more noise frequencies each equal to one of the one or more noise frequencies are filtered out from the group of specific frequencies associated with each of the four corners of the capacitive touch panel, respectively (S522). In addition, the step S505 is a step of summing the current values associated with the group of selected frequencies for each of the four corners of the capacitive touch panel (not shown), and the noise filtering procedure is performed only at a specific condition.

Figure 5C:
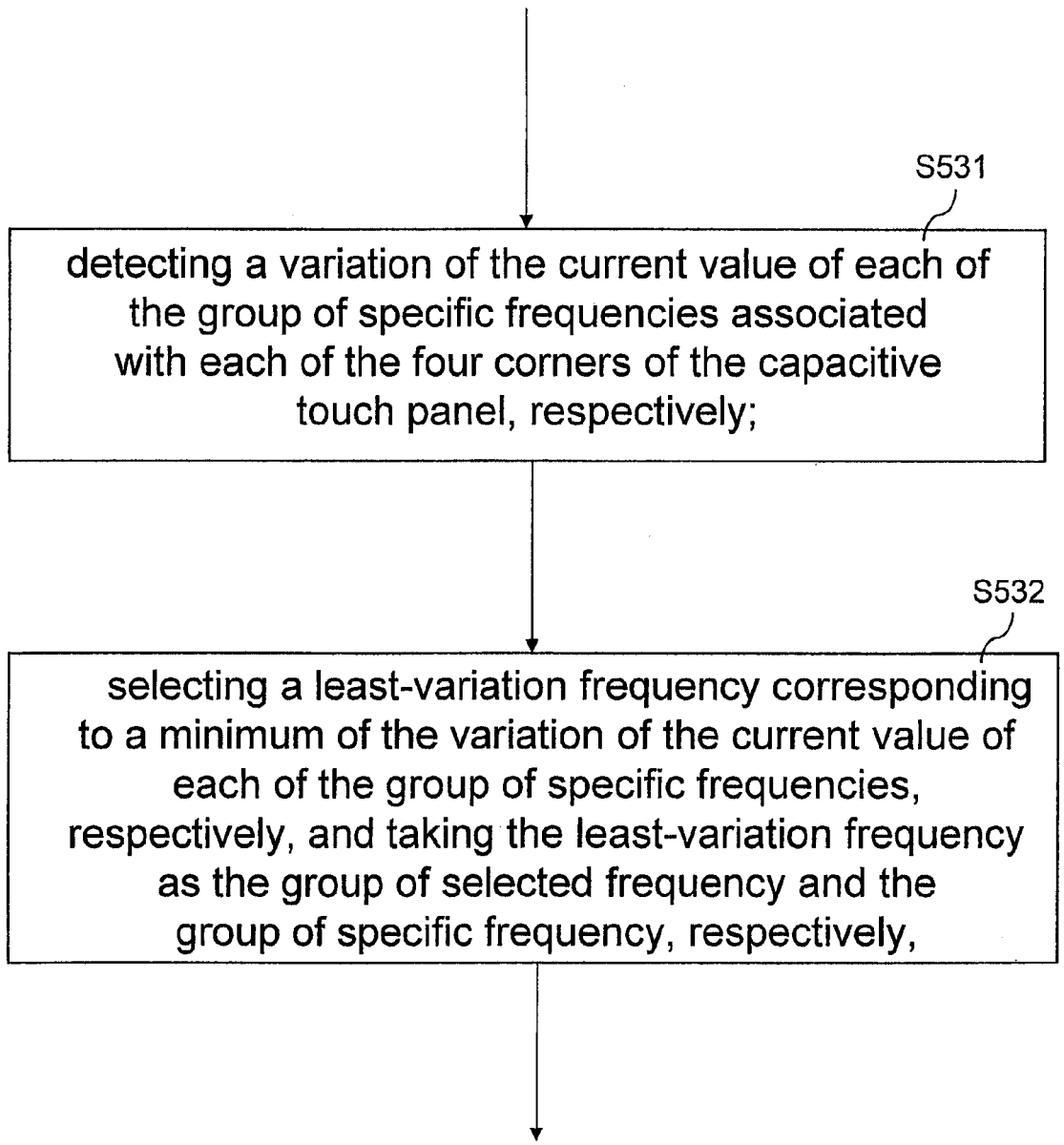

In the third embodiment shown in FIG. 5C, the noise filtering procedure comprises the following steps. A variation of the current value of each of the group of specific frequencies associated with each of the four corners of the capacitive touch panel, respectively (S531). A least-variation frequency corresponding to a minimum of the variation of the current value of each of the group of specific frequencies is selected, respectively, and the least-variation frequency is taken as the group of selected frequency and the group of specific frequency, respectively (S532). In addition, the step S505 is a step of summing the current values associated with the group of selected frequencies for each of the four corners of the capacitive touch panel (not shown) and the noise filtering procedure is performed only at a specific condition.

In the above, the specific condition is one of the following conditions: the capacitive touch panel is set up, the capacitive touch panel is powered on, and a specific work task begins on the capacitive touch panel.

Figure 6:
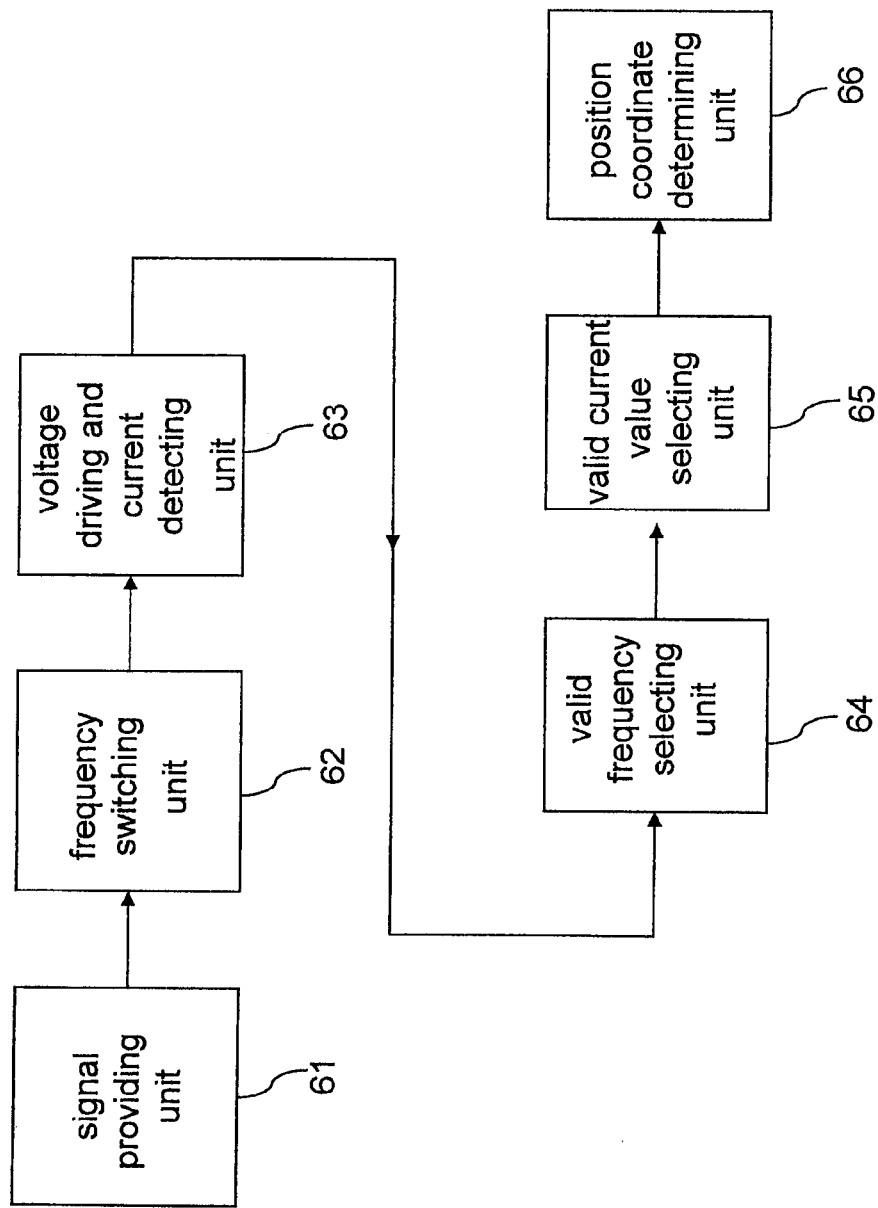
FIG. 6 is a block diagram of a device of determining the touch position on the sensing area capacitive touch panel according to the present invention.

Referring to FIG. 6, a block diagram of a device for determining a touch position on a sensing area of a capacitive touch panel according to the present invention is depicted therein. As shown, the device 60 comprises a signal providing unit 61, a signal providing unit 62, a frequency switching unit 63, a voltage driving and current detecting unit 64, a valid frequency selecting unit 65 and a position coordinate calculation unit 66.

The signal providing unit 61 is used to alternatively provide an AC scan signal having a frequency and a current value to each of four corners of the capacitive touch panel, respectively.

The frequency switching unit 62 is configured to rapidly switch the frequency of the AC scan signal associated with each of the four corners among a group of specific frequencies.

The voltage driving and current detecting unit 63 is provided to drive the capacitive touch panel by alternatively using the AC scan signal associated with each of the four corners, respectively, and detect the current value of the AC scan signal of each of the group of specific frequencies associated with each of the four corners of the capacitive touch panel, respectively.

The valid frequency selecting unit 64 receives the current value of the AC scan signal of each of the group of specific frequencies associated with each of the four corners of the capacitive touch panel, respectively, and select a group of selected frequencies according to a noise filtering procedure from the group of specific frequencies associated with each of the four corners of the capacitive touch panel based on the current value of each of the group of specific frequencies, respectively.

The valid current value selecting unit 65 obtains a final current value by calculating the current value of the AC scan signal of each of the group of selected frequencies associated with each of the four corners of the capacitive touch panel, respectively.

The position coordinate calculation unit 66 is used to calculate a coordinate value of the touch position on the capacitive touch panel based on the final current value associated with each of the four corners of the capacitive touch panel, respectively.

With use of the inventive device and method, since the determination of the touch position on the capacitive touch panel is relatively more free from the noise effect as compared to that of the prior art, the insufficient precision issue of the touch position determination on the capacitive touch panel is greatly overcome.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A device for determining a touch position on a sensing area of a capacitive touch panel, comprising:
   a signal providing unit alternatively providing an alternating current (AC) scan signal having a frequency and a current value to each of four corners of the capacitive touch panel, respectively;
   a frequency switching unit rapidly switching the frequency of the AC scan signal associated with each of the four corners among a group of specific frequencies;
   a voltage driving and current detecting unit driving the capacitive touch panel by alternatively using the AC scan signal associated with each of the four corners, respectively, and detecting the current value of the AC scan signal of each of the group of specific frequencies associated with each of the four corners of the capacitive touch panel, respectively;
   a valid frequency selecting unit receiving the current value of the AC scan signal of each of the group of specific frequencies associated with each of the four corners of the capacitive touch panel, respectively, and selecting a group of selected frequencies according to a noise filtering procedure from the group of specific frequencies associated with each of the four corners of the capacitive touch panel based on the current value of each of the group of specific frequencies, respectively;
   a valid current value selecting unit obtaining a final current value by calculating the current value of the AC scan signal of each of the group of selected frequencies associated with each of the four corners of the capacitive touch panel, respectively; and
   a position coordinate calculation unit calculating a coordinate value of the touch position on the capacitive touch panel based on the final current value associated with each of the four corners of the capacitive touch panel, respectively.

2. The device as claimed in claim 1, wherein the noise filtering procedure comprises the steps of:
   determining one or more of the group of specific frequencies having the current value having a variation larger than a threshold as one or more to-be-filtered frequencies associated with each of the four corners of the capacitive touch panel, respectively; and
   filtering out the one or more to-be-filtered frequencies from the group of specific frequencies as the group of selected frequencies for each of the four corners of the capacitive touch panel, respectively, and
   the step of calculating the current value is a step of summing the current value associated with each of the group of selected frequencies for each of the four corners of the capacitive touch panel, respectively.

3. The device as claimed in claim 1, wherein noise filtering procedure comprises the steps of:
   determining one or more noise frequencies causing a noise to the four corners of the capacitive touch panel, respectively, resulted from an ambient environment and a user of the capacitive touch panel by detecting a variation of the current value of each of the group of specific frequencies associated with each of the four corners of the capacitive touch panel, respectively; and
   filtering out one or more noise frequencies each equal to one of the one or more noise frequencies from the group of specific frequencies associated with each of the four corners of the capacitive touch panel, respectively, and
   the step of calculating the current value is a step of summing the current values associated with the group of selected frequencies for each of the four corners of the capacitive touch panel; and
   the noise filtering procedure is performed only at a specific condition.

4. The device as claimed in claim 3, wherein the specific condition is one of the following conditions: the capacitive touch panel is set up, the capacitive touch panel is powered on, and a specific work task begins on the capacitive touch panel.

5. The device as claimed in claim 1, wherein the noise filtering procedure comprises the steps of:
   detecting a variation of the current value of each of the group of specific frequencies associated with each of the four corners of the capacitive touch panel, respectively; and
   selecting a least-variation frequency corresponding to a minimum of the variation of the current value of each of the group of specific frequencies, respectively, and taking the least-variation frequency as the group of selected frequency and the group of specific frequency, respectively, and the step of calculating the current value is a step of summing the current values associated with the group of selected frequencies for each of the four corners of the capacitive touch panel; and the noise filtering procedure is performed only at a specific condition.

6. The device as claimed in claim 5, wherein the specific condition is one of the following conditions: the capacitive touch panel is set up, the capacitive touch panel is powered on, and a specific work task begins on the capacitive touch panel.

7. The device as claimed in claim 1, wherein each of the group of specific frequencies is less than 200 kHz.

8. The device as claimed in claim 1, wherein the AC scan signal for each of the four corners of the capacitive touch panel is one of a square-wave signal and a sinusoidal or cosine-wave signal.

9. A method for determining a touch position on a sensing area of a capacitive touch panel, comprising the steps of:

alternatively providing an alternating current (AC) scan signal having a frequency and a current value to each of four corners of the capacitive touch panel, respectively;

rapidly switching the frequency of the AC scan signal associated with each of the four corners among a group of specific frequencies;

driving the capacitive touch panel by alternatively using the AC scan signal associated with each of the four corners, respectively, and detecting the current value of the AC scan signal of each of the group of specific frequencies associated with each of the four corners of the capacitive touch panel, respectively;

receiving the current value of the AC scan signal of each of the group of specific frequencies associated with each of the four corners of the capacitive touch panel, respectively, and selecting a group of selected frequencies according to a noise filtering procedure from the group of specific frequencies associated with each of the four corners of the capacitive touch panel based on the current value of each of the group of specific frequencies, respectively;

obtaining a final current value by calculating the current value of the AC scan signal of each of the group of selected frequencies associated with each of the four corners of the capacitive touch panel, respectively; and calculating a coordinate value of the touch position on the capacitive touch panel based on the final current value associated with each of the four corners of the capacitive touch panel, respectively.

10. The method as claimed in claim 9, wherein the noise filtering procedure comprises the steps of:

determining one or more of the group of specific frequencies having the current value having a variation larger than a threshold as one or more to-be-filtered frequencies associated with each of the four corners of the capacitive touch panel, respectively; and filtering out the one or more to-be-filtered frequencies from the group of specific frequencies as the group of selected frequencies for each of the four corners of the capacitive touch panel, respectively, and the step of calculating the current value is a step of summing the current value associated with each of the group of selected frequencies for each of the four corners of the capacitive touch panel, respectively.

11. The method as claimed in claim 9, wherein the noise filtering procedure comprises the steps of:

determining one or more noise frequencies causing a noise to the four corners of the capacitive touch panel, respectively, resulted from an ambient environment and a user of the capacitive touch panel by detecting a variation of the current value of each of the group of specific frequencies associated with each of the four corners of the capacitive touch panel, respectively; and filtering out one or more noise frequencies each equal to one of the one or more noise frequencies from the group of specific frequencies associated with each of the four corners of the capacitive touch panel, respectively, and the step of calculating the current value is a step of summing the current values associated with the group of selected frequencies for each of the four corners of the capacitive touch panel; and the noise filtering procedure is performed only at a specific condition.

12. The method as claimed in claim 11, wherein the specific condition is one of the following conditions: the capacitive touch panel is set up, the capacitive touch panel is powered on, and a specific work task begins on the capacitive touch panel.

13. The device as claimed in claim 9, wherein the noise filtering procedure comprises the steps of:

detecting a variation of the current value of each of the group of specific frequencies associated with each of the four corners of the capacitive touch panel, respectively; and selecting a least-variation frequency corresponding to a minimum of the variation of the current value of each of the group of specific frequencies, respectively, and taking the least-variation frequency as the group of selected frequency and the group of specific frequency, respectively, and the step of calculating the current value is a step of summing the current values associated with the group of selected frequencies for each of the four corners of the capacitive touch panel; and the noise filtering procedure is performed only at a specific condition.

14. The method as claimed in claim 13, wherein the specific condition is one of the following conditions: the capacitive touch panel is set up, the capacitive touch panel is powered on, and a specific work task begins on the capacitive touch panel.

15. The method as claimed in claim 9, wherein each of the group of specific frequencies is less than 200 kHz.

16. The method as claimed in claim 9, wherein the AC scan signal for each of the four corners of the capacitive touch panel is one of a square-wave signal and a sinusoidal or cosine-wave signal.

* * * * *